US008171086B2

(12) United States Patent
Bryant (10) Patent No.: US 8,171,086 B2
(45) Date of Patent: May 1, 2012

(54) AUTOMATED RECOGNITION OF INDIVIDUAL AWARDS VIA INTERNAL E-MAIL

(75) Inventor: Ned Bryant, Allen, TX (US)

(73) Assignee: Slingshot, LLC, Dallas, TX (US)

( * ) Notice: Subject to any disclaimer, the term of this patent is extended or adjusted under 35 U.S.C. 154(b) by 1075 days.

(21) Appl. No.: 11/562,769

(22) Filed: Nov. 22, 2006

(65) Prior Publication Data
US 2008/0120384 A1  May 22, 2008

(51) Int. Cl.
*G06F 15/16* (2006.01)
(52) U.S. Cl. ........ 709/206; 709/204; 709/205; 709/203; 709/207
(58) Field of Classification Search ................... 709/206, 709/203, 204, 207
See application file for complete search history.

(56) References Cited

U.S. PATENT DOCUMENTS

| | | | |
|---|---|---|---|
| 7,003,479 | B2 | 2/2006 | Cowell et al. |
| 7,778,868 | B2 * | 8/2010 | Haugen et al. ............... 705/14.1 |
| 2002/0029179 | A1 | 3/2002 | Gruber et al. |
| 2002/0073026 | A1 | 6/2002 | Gruber et al. |
| 2003/0009528 | A1 | 1/2003 | Sharif et al. |
| 2003/0131061 | A1 * | 7/2003 | Newton et al. ............... 709/206 |
| 2003/0177067 | A1 * | 9/2003 | Cowell et al. ................ 705/14 |
| 2004/0049399 | A1 | 3/2004 | Familian et al. |
| 2004/0088215 | A1 * | 5/2004 | Rochelle et al. ............. 705/14 |
| 2004/0250202 | A1 * | 12/2004 | Williams ...................... 715/513 |
| 2005/0114157 | A1 | 5/2005 | Moskowitz et al. |
| 2005/0154673 | A1 | 7/2005 | Fellenstein et al. |
| 2005/0193065 | A1 * | 9/2005 | Sugimoto et al. ............ 709/206 |
| 2005/0240433 | A1 | 10/2005 | Schwartz et al. |
| 2006/0036496 | A1 | 2/2006 | Cowell et al. |
| 2006/0075035 | A1 | 4/2006 | Tripp |
| 2007/0180039 | A1 * | 8/2007 | Sutidze et al. ............... 709/206 |

FOREIGN PATENT DOCUMENTS

| | | | |
|---|---|---|---|
| JP | 2001265993 A | * | 9/2001 |
| WO | WO 9723838 A1 | * | 7/1997 |

OTHER PUBLICATIONS

Chapter 12 Links, HTML 4.01 Specification W3C Recommendation, Dec. 24, 1999, 12 pages.

* cited by examiner

*Primary Examiner* — Wing Chan
*Assistant Examiner* — Kostas Katsikis
(74) *Attorney, Agent, or Firm* — Marc A. Hubbard; Gardere Wynne Sewell LLP (57) ABSTRACT

A method, system, and computer program product for automatically recognizing employee achievements via enterprise e-mails is provided. In one embodiment, an enterprise e-mail server receives an e-mail from a sender within the enterprise. The enterprise e-mail server generates a recognition link to a dynamically generated web page, wherein the web page lists recognitions/awards information for the sender. The enterprise e-mail server also generates an icon link for an icon representing recognitions/awards received by the sender and appends the recognition link and the icon link into the e-mail. The e-mail with embedded web page and icon link is then relayed to the e-mail recipient.

22 Claims, 7 Drawing Sheets

AUTOMATED RECOGNITION OF INDIVIDUAL AWARDS VIA INTERNAL E-MAIL

BACKGROUND OF THE INVENTION

Instilling and maintaining employee morale and motivation are issues as old as the existence of the employer-employee relationships itself Engendering loyalty and an attitude of conscientiousness and hard work is always important to the success of an enterprise. However, too often, it is difficult to achieve.

One method employers have had to aid in motivating employees are employee recognition and awards programs. In smaller enterprises, especially in the past, it was common for all employees to see each other frequently. Thus, any rewards or achievements received by one employee were more likely to be apparent to others, thereby providing motivation to other employees to strive to do better or emulate the other employee out of a sense of pride in them selves in order to achieve similar rewards. However, contact between employees in larger enterprises is much less likely, making it more difficult to advertise awards and employee recognition. Furthermore, even many smaller enterprises today have work forces that are spread out across a wide geographic area such that personal interactions between employees and their employers and fellow employees is sometimes rare or non-existent with communication provided by means of various technologies. Thus, methods of motivating employees that depend on personal interaction are often lacking.

SUMMARY OF THE INVENTION

The present invention pertains to methods, systems, and computer program products for automatically recognizing achievements of the sender of the email within a group organization or enterprise, thereby enhancing the effectiveness of recognition and awards programs through continued recognition among those who personally interact with the employee by e-mail. In one exemplary implementation, an e-mail server receives an e-mail from an employee within an enterprise. A process in the e-mail server, and/or a program in communication with it, generates an icon or a link for an icon representing awards received by the sender and appends the recognition link and the icon or icon link into the e-mail Also generated is a link to a web page that lists recognitions/awards information. The e-mail is then relayed to the e-mail recipient. When the recipient opens the message, the icon is displayed. Selecting the icon pulls up a web page with more information concerning the recognition or awards. Preferably, the icon, or icon link, and the award information link are either added only to emails sent to a predetermined group of authorized recipients, such as other employees within the same group, organization or enterprise, or the URLs in the links cannot be accessed by other than the predetermined set of recipients.

DESCRIPTION OF PREFERRED EMBODIMENTS

In the following description, like numbers refer to like parts. As used herein, the term "award" refers to an award, honor, achievement or recognition received by an employee or member of an organization. The terms "organization" and "enterprise" refer to any formal or informal entity to which individuals belong, or with which individuals are associated, such as a business enterprise, non-profit organization, or association, or any part, subdivision or unit of them.

Figure 1:
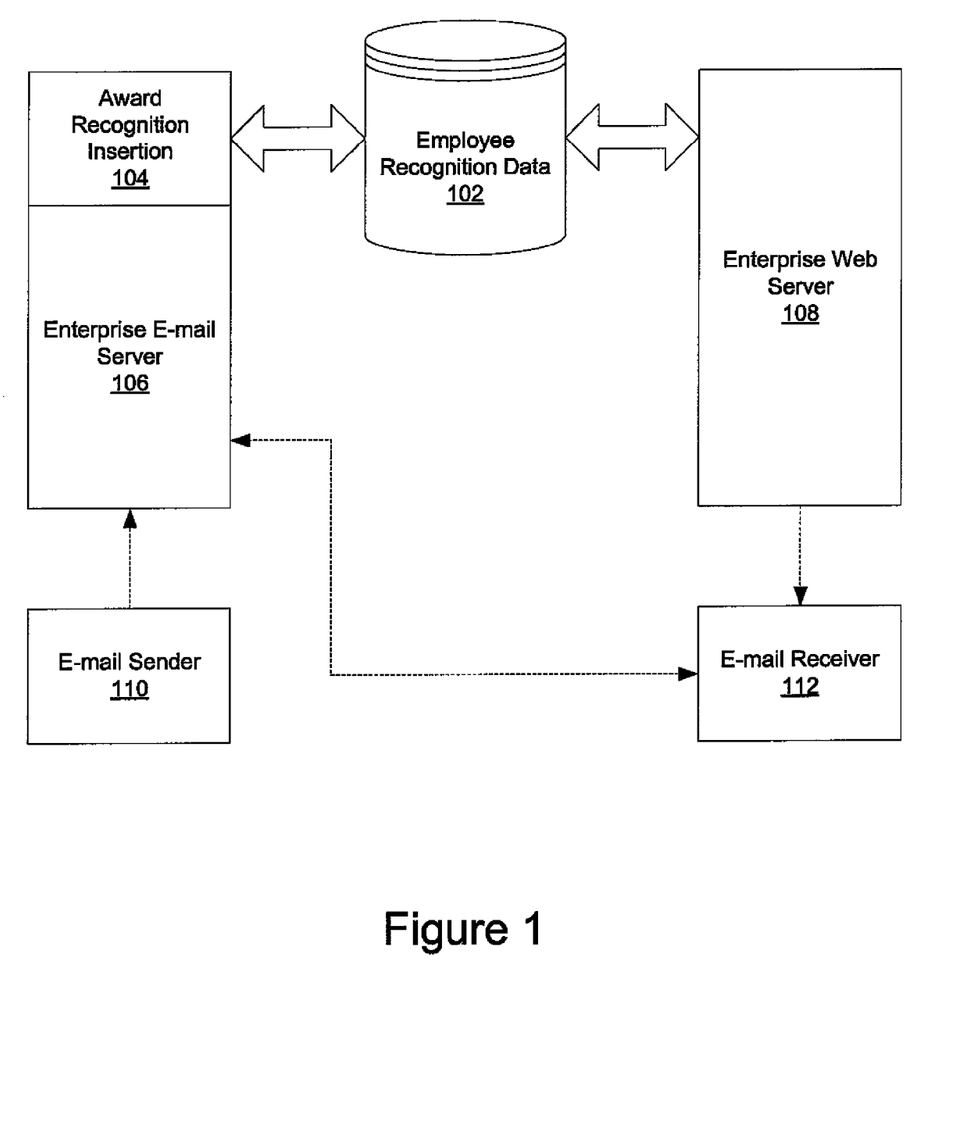
FIG. 1 illustrates a schematic diagram of an exemplary employee recognition e-mail system.

Referring to FIG. 1, an e-mail based recognition system is, in one exemplary embodiment, implemented with an enterprise e-mail server 106, an enterprise web server 108, and award recognition insertion unit 104, and employee recognition data 102. In this example, the enterprise email server provides email services to a single enterprise. The email server could, however, be hosted by a third party. Information for identifying employee awards for the enterprise are stored as part of employee recognition data 102. This data 102 is, for example, stored in one or more databases. The databases may be used to store other information about the employee. This employee award information preferably includes information for identifying awards bestowed on the employee by the enterprise and, optionally, also by external groups and organizations. It also optionally includes information describing the achievements, honors, and awards and how it is awarded. The information stored in employee recognition data 102 may also include additional information on the actions of the employee giving rise to the award. An icon is preferably also associated with each award, or a grouping of them, either by storing the icon or a reference to the icon in employee recognition data 102. The icon may include graphics, text, animation, photographs, video, sound, or a combination of one or more of these elements.

When an employee within the enterprise creates and sends an e-mail, award recognition insertion unit 104 queries data 102. If the employee has received one or more achievements, honors, and awards, the award recognition insertion unit 104 then inserts into the e-mail one or more icons or, alternately, links to one or more icons, where the one or more icons represent these achievements, honors, and awards. In one exemplary embodiment, the insertion point within the e-mail is at the bottom of the e-mail below the signature or last lines of text and graphics. However, other insertion points are also permissible and that the particular insertion point is not critical but rather merely a matter of preference. Text may, optionally, also be inserted with the icons. The text may be explanatory or it may augment the icon.

Award recognition insertion unit 104 preferably also generates a selectable link that specifies a resource available on a network using, for example, a universal resource locator (URL). This link is inserted into or appended to the e-mail. The link provides the e-mail recipient with access to a web page that provides information about the awards given to the sender and, optionally, additional information about the sender of the email. The link may be a link to a static web page maintained on enterprise web server 108 or may be a link to a dynamically created web page with data instructing how enterprise web server 108 is to create the web page. For example, the link may include a reference to a script and a variable identifying the employee. The link may be selected by selecting the icon inserted into the e-mail or may be selected by a different anchor. In some embodiments, there may be several links representing several web pages inserted into the e-mail such that selection of any particular icon will retrieve and display a web page containing information about the particular award represented by the icon. In other embodiments, a single link will be embedded within the e-mail such that selection of the link will retrieve and display a web page with information about the sender and the awards associated with the sender.

Once insertions into the e-mail have been made, the enterprise e-mail server 106 sends the e-mail message to the e-mail receiver 112. If the destination of the e-mail is on the same e-mail server, the message is posted to the recipient's account or "inbox." When the recipient of the e-mail displays the e-mail, the displayed e-mail will contain, in addition to the text and other information created by the sender, at least one icon (assuming that, if a link to the icon is inserted, the icon is downloaded). When the e-mail receiver 112 selects the icon, it is preferred that a web page containing information about the awards received by the sender is retrieved from enterprise web server 108.

Figure 2A:
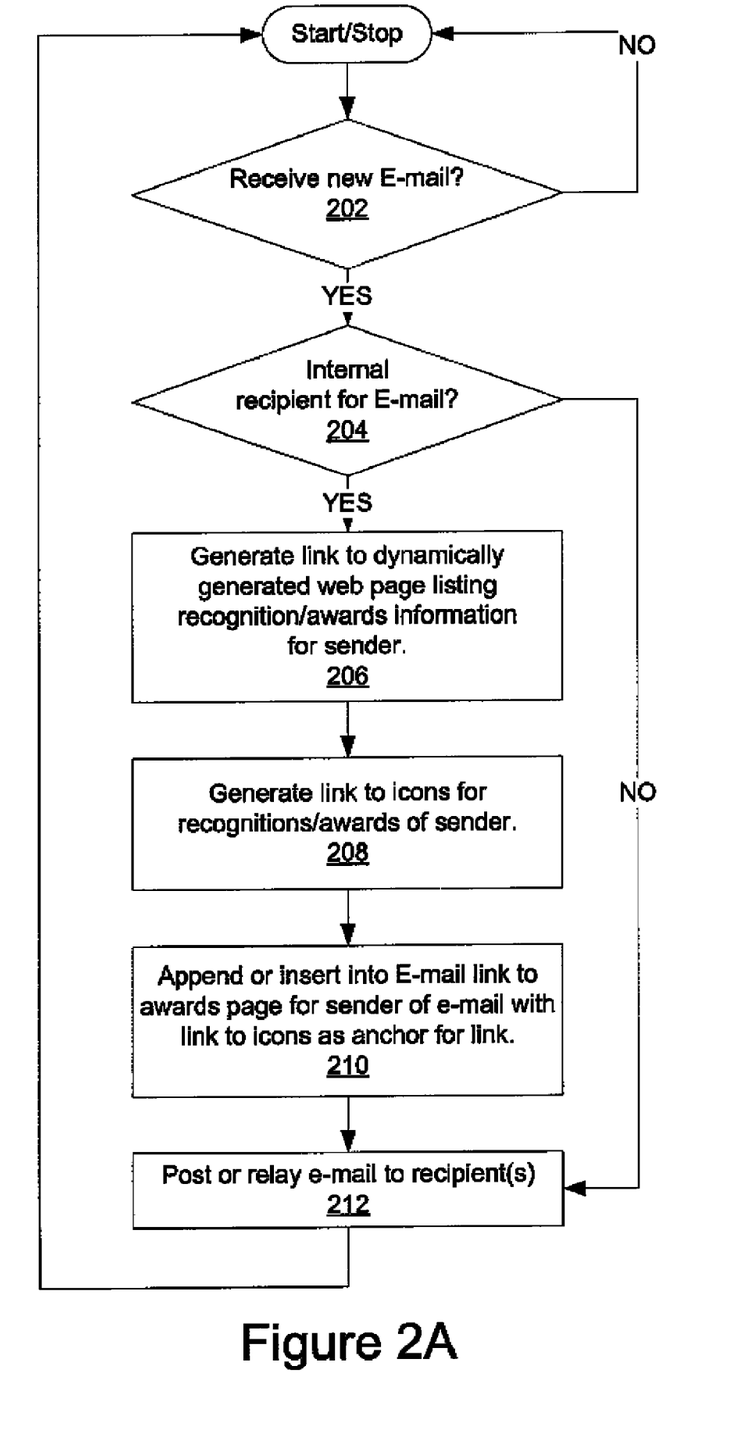
FIG. 2A is a flowchart of an exemplary process for recognizing an employee via an e-mail.

Turning to FIG. 2A, a flowchart illustrating an exemplary process for recognizing an employee via an e-mail is depicted in accordance with one embodiment of the present invention. An e-mail server monitors e-mail communications from employees of a business or members of a group or organization making use of the server, for new messages (step 202). If a new e-mail has been received, then the process determines whether the recipient of the e-mail is internal, part of the same organization (e.g. the same business) or is otherwise authorized to receive information about awards given to the sender (step 204). This step is optional. If the recipient(s) is not internal, then the e-mail server preferably posts or relays the e-mail to the recipient(s) without appending a recognition icon and link (step 212). Not appending links avoids sending links to persons outside the organization. Alternately, links that can be resolved only from within the enterprise, either because the URLs use a private address or the server which the links resolve responds only to requests from within the organization, such as internal addresses or public address within a range of authorized addresses.

If the recipient is internal to the organization, or otherwise authorized to receive information about awards, then the award recognition insertion unit generates a link to, for example, a web page which lists information on awards or other recognition given to the sender (step 206). The award recognition insertion unit also generates an icon or a link to icons for awards given to the sender (step 208). The process then appends or inserts into the e-mail the link to at least one web page that at least identifies the awards, with one or more icons or links to the icons as an anchor for the link to the web page (step 210). The enterprise server then posts or relays the e-mail (step 212).

Figure 2B:
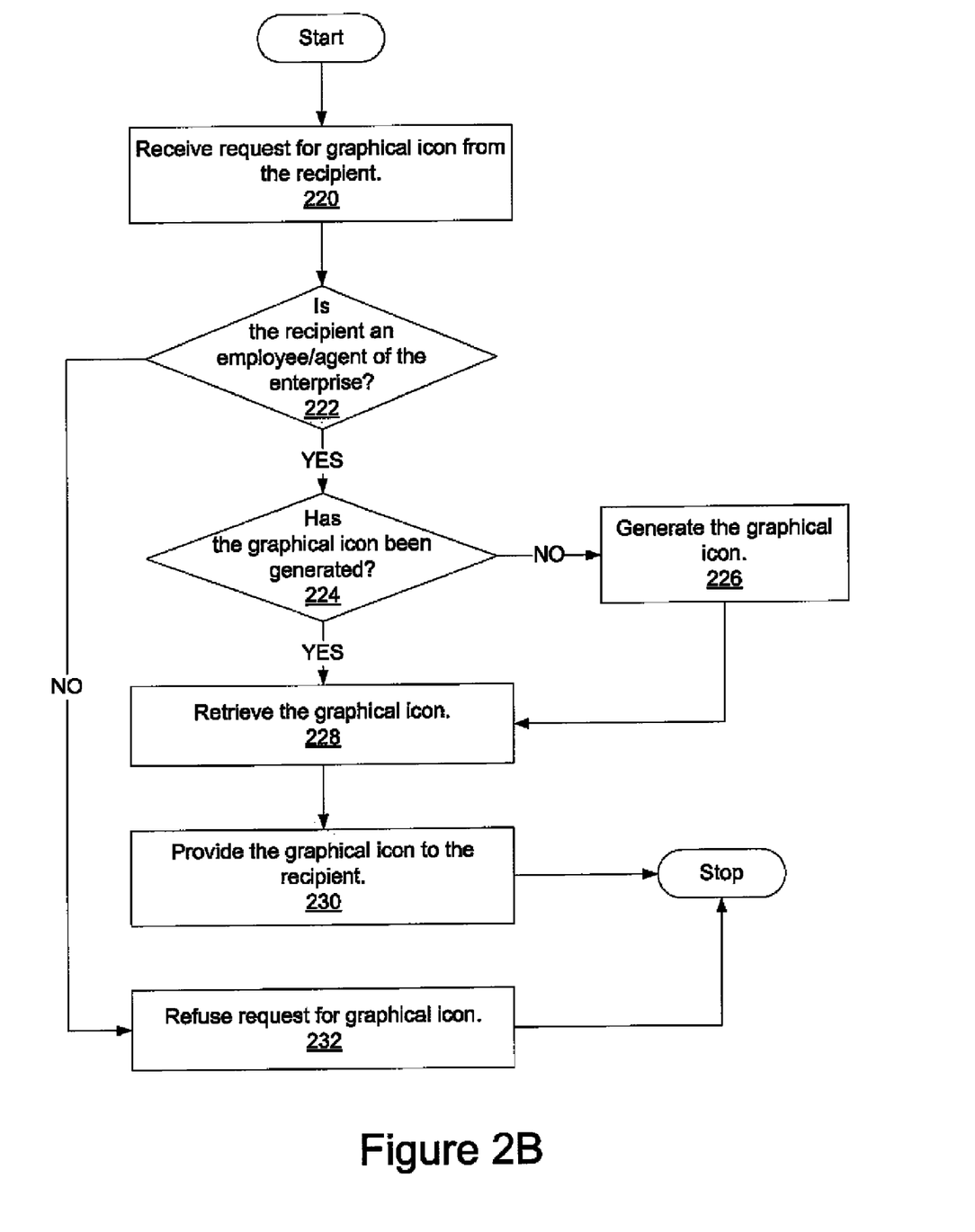
FIG. 2B is a flowchart illustrating an exemplary process for providing a graphical icon to an e-mail recipient.

FIG. 2B is a flowchart illustrating an exemplary process for providing a graphical icon to an e-mail recipient. Once a recipient has received the e-mail, the recipient's email client will display in the email, if configured to do so, each icon. If only a link to each icon is provided, it will, if configured to do so, download each icon from a server (step 220), which is maintained by or on behalf of the enterprise. The server preferably determines whether the e-mail recipient is authorized to receive the icon (step 222). If the e-mail recipient is not authorized,—for example, the recipient is not an employee of the enterprise—, then the server preferably does not provide the icon to the e-mail recipient (step 232). The server determines whether the recipient is authorized by evaluating, for example, whether its IP or network address is external to the organization or not otherwise authorized. This prevents information from being accessed by unauthorized individuals when an email has been forwarded by the original, authorized recipient. If the e-mail recipient is authorized to receive the icon, then the server determines whether the icon has been generated (step 224). If the icon has not been generated, then the enterprise server generates the icon based on the information, at least in part, provided by the icon link embedded in the e-mail (step 226) and, optionally, employee recognition data. Generation of the icon is an optional step. Icons will typically be created and assigned in advance for each award. These icons could even be personalized to the award winner. However, the icon could, if desired, be generated dynamically based on the user. For example, text may automatically be combined with a graphical element based on the user or the circumstances (e.g. date) of the award. The icon is retrieved at step 228 and provided to the e-mail recipient (step 230).

Figure 2C:
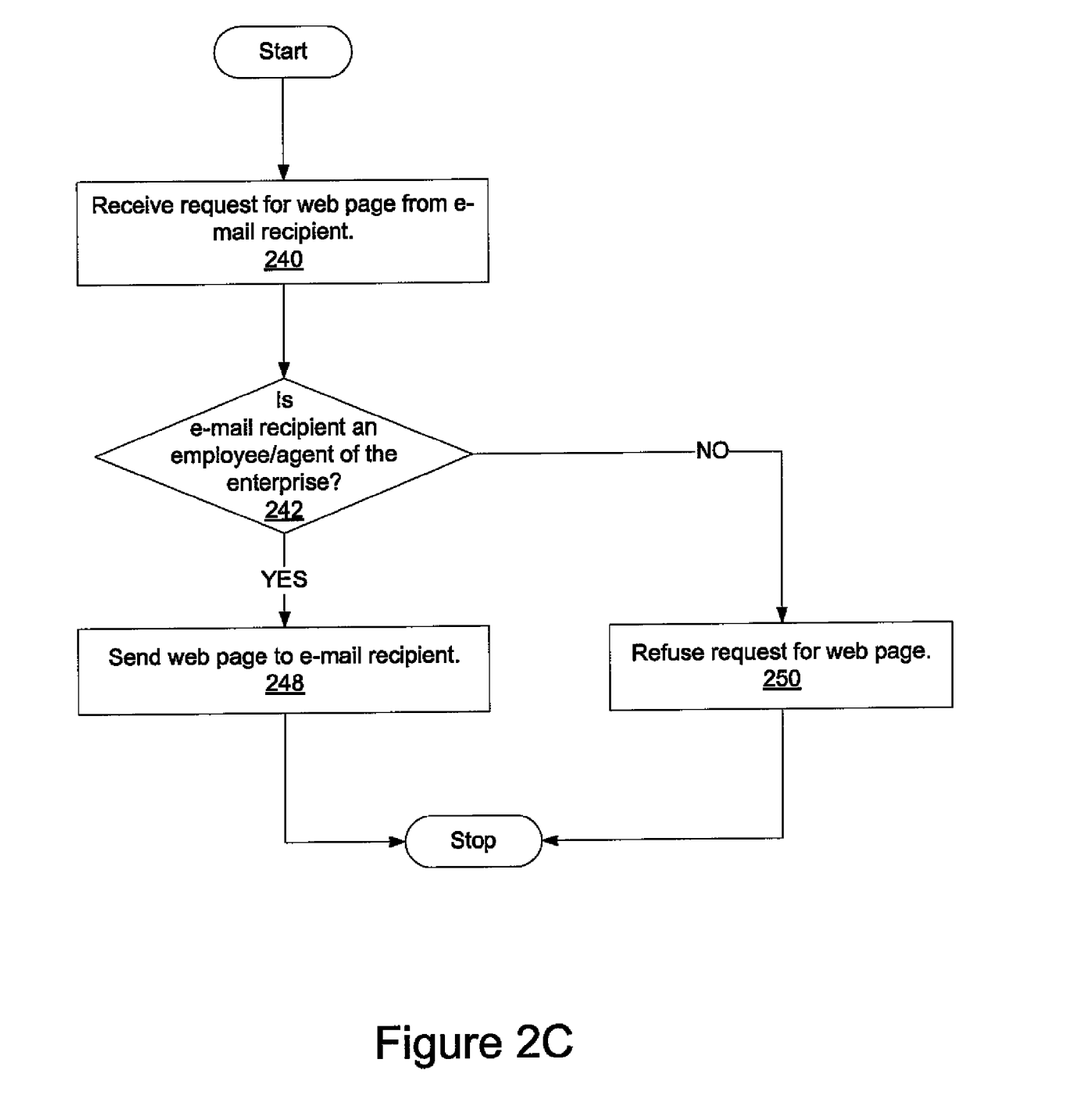
FIG. 2C is a flow chart illustrating an exemplary process flow for providing an email recipient with a web page corresponding to a sender's information and awards.

FIG. 2C is a flowchart illustrating an exemplary process flow for providing an e-mail recipient with a web page corresponding to a sender's information and awards in accordance with one embodiment of the present invention. When an e-mail recipient selects a link in the email to receive more information about an award, the request is received by the web server (step 240). The web server determines whether the e-mail recipient is authorized to receive the web page (step 242). Typically, in a business enterprise or other organizational setting, only other employees are authorized to receive this information, although authorization could be limited to a subset of employees or could be expanded to others outside the organization, at least for particular awards that may be appropriately advertised to others outside the organization. If the e-mail recipient is not authorized, then the request for the web page is refused (step 250). If the e-mail recipient is authorized, the web server serves the requested web page unless there is an error.

Figure 3A:
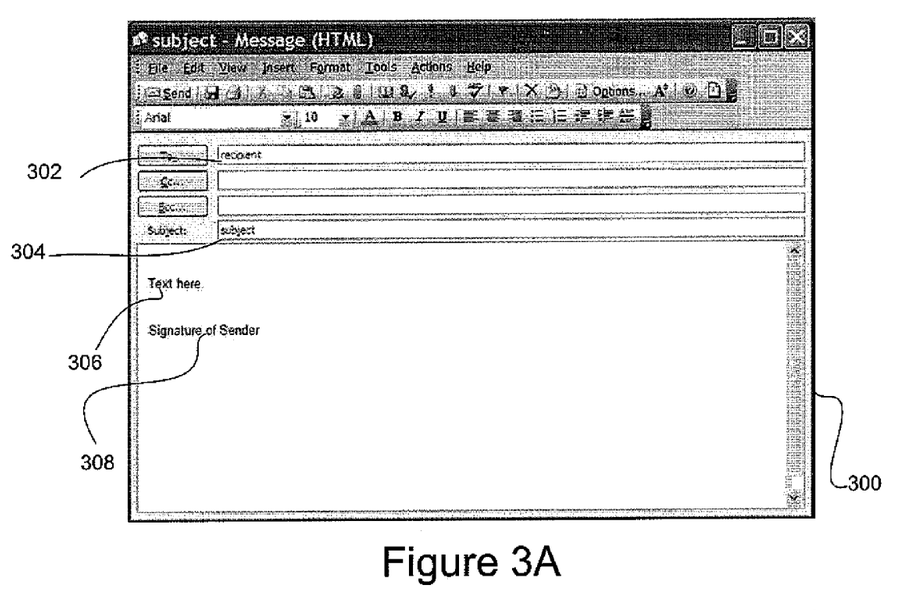
FIG. 3A-3B illustrate exemplary e-mails before and after appending recognition icons to the e-mail.
Figure 3B:
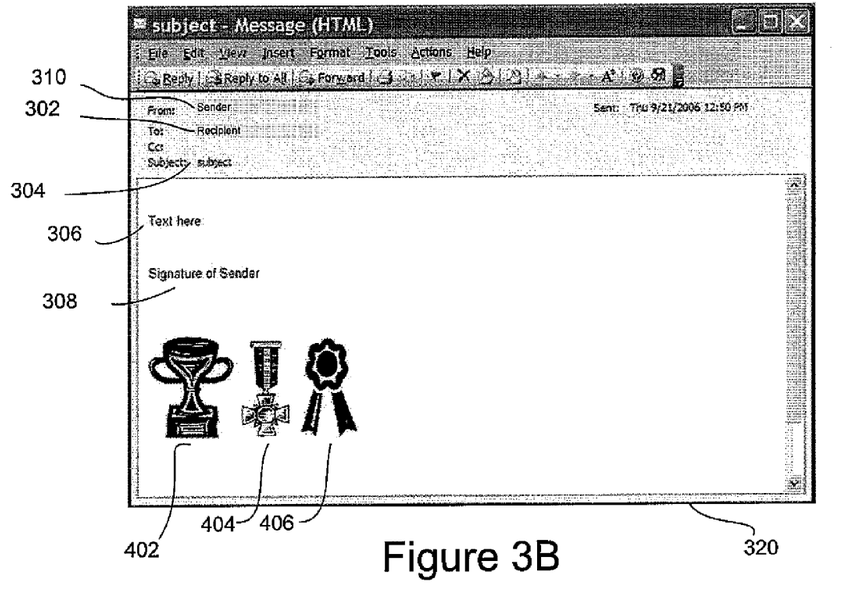

FIGS. 3A-3B illustrate exemplary e-mails before and after appending recognition icons to the e-mail. E-mail 300 is an example of an e-mail as prepared by a sender and includes the typical elements of recipient address 302, subject 304, text of the message 306, and optionally, a signature of the sender 308. Once the sender has completed constructing the e-mail 300, the sender then sends the e-mail, and the e-mail is delivered to a predefined server, such as, for example, e-mail server 106 depicted in FIG. 1. The server then determines the identity of the sender based on the identity of the e-mail sender, and award recognition insertion unit then generates one or more link(s) to a web page with information on awards given to the sender by the organization, and either an icon or a link to an icon that serves as an anchor for the link to the web page. The icon represents one or more awards given to the sender. These icons and/or links are then embedded into the e-mail 300 and the modified e-mail 300 is sent to the recipient. It is preferred that the body of the c-mail message is formatted using a Hypertext Markup Language (HTML) message or similar format in which links may be embedded.

FIG. 3B illustrated an exemplary e-mail as it appears to a recipient after it has been displayed. Modified e-mail 320 includes icons 402, 404, and 406 which were not present in e-mail 300 as sent by the sender. Most e-mail client programs will display HTML messages by downloading linked graphics, usually when they are opened or when the user authorizes downloading of the images. The icons 402, 404, and 406 may be embedded (e.g. MIME attachments) or downloaded from a link embedded in the email 320. Icons 402, 404, and 406 represent awards, achievements or honors received by the sender. Icons 402, 404, and 406 are selectable by the recipient and, when selected, retrieve and open a web page that provides information about the award represented by the icon and/or information about the sender. Each icon 402, 404, and 406 may be separately selectable such that selection of the icon retrieves and displays a web page with information about the award represented by a particular icon or, alternatively, may be combined into a single selectable image that retrieves and loads a web page with information about all of the awards represented by each icon and/or information about the sender.

Figure 4:
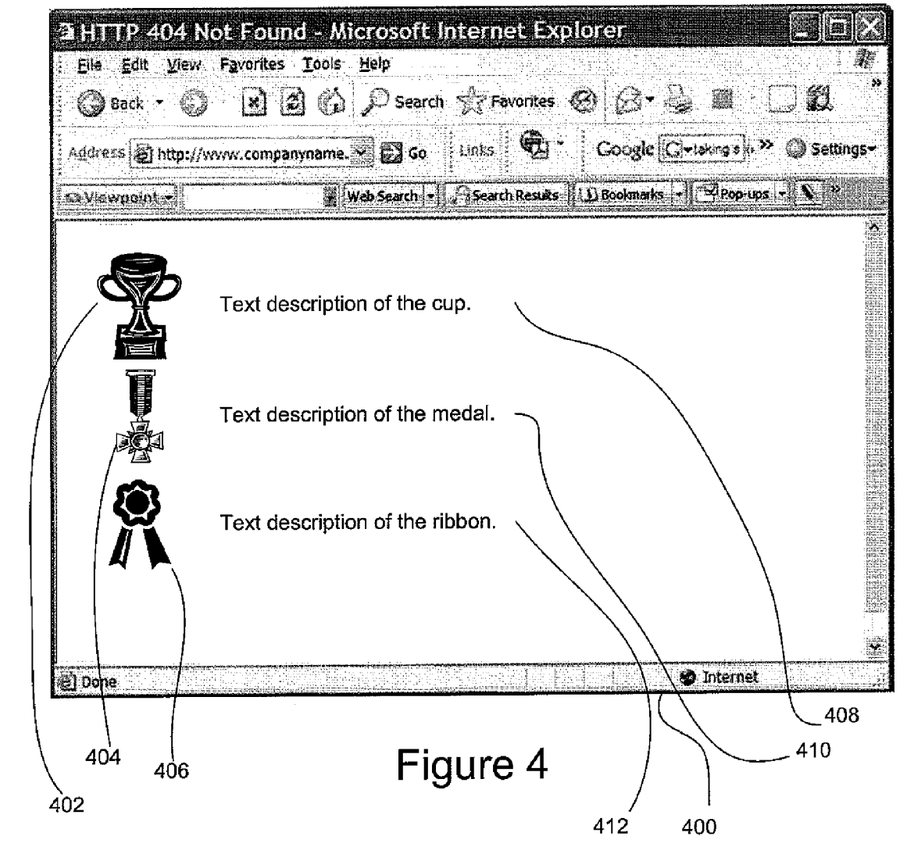
FIG. 4 illustrates an exemplary web page that may be presented to an e-mail recipient upon selection of the embedded link in the e-mail.

FIG. 4 illustrates an exemplary web page that may be presented to an e-mail recipient upon selection of the embedded link in the e-mail. Web page 400 provides a graphical representation of each icon 402, 404, and 406 with a textual description 408, 410, and 412 of each award represented by a respective icon 402, 404, and 406 next to that respective icon 402, 404, and 406. The textual description may include a link to more information, such as how to qualify for the award.

Figure 5:
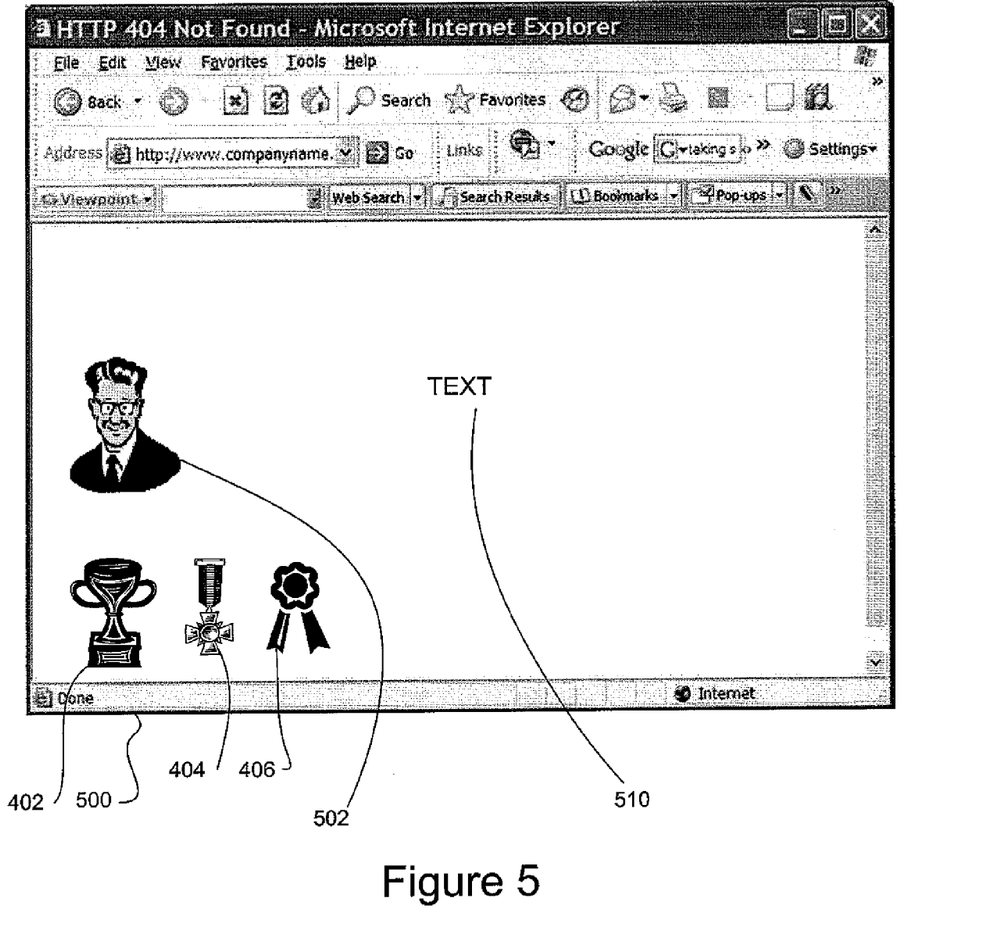
FIG. 5 illustrates an alternative exemplary web page that may be presented to an e-mail recipient upon selection of the embedded link in the e-mail.

FIG. 5 illustrates an alternative exemplary web page that may be presented to an e-mail recipient upon selection of the embedded link in the e-mail. Web page 500 includes a photograph 502 of the e-mail sender, graphical icons 402, 404, and 406 representing awards received by the e-mail sender and text 510 describing the e-mail sender, the awards received by the e-mail sender, and other relevant biographical information.

The graphical icons embedded within the e-mail serve as a subtle motivator to the e-mail recipients much in the same way that badges and medals worn by soldiers do to motivate those observing the badges and medals or the graphical icons disclosed herein to emulate that person and/or to achieve other goals thereby increasing productivity.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs.

The description of the present invention has been presented for purposes of illustration and description, but is not intended to be exhaustive or to limit the invention to the form disclosed. Modifications and variations to the illustrative embodiments are possible without departing from the scope of the invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for recognizing individual achievements in an enterprise via e-mail, the method comprising:
   receiving at an e-mail server for the enterprise an e-mail from a sender who is a member of the enterprise and has previously been recognized by the enterprise with at least one award;
   generating an award link to a dynamically generated web page listing award information for the sender;
   generating a graphical icon or an icon link for a graphical icon representing at least one award received by the sender;
   inserting the award link, and the graphical icon or icon link, into the e-mail and relaying the e-mail to a recipient if the recipient is a member of an enterprise; and
   responsive to a determination that the recipient is not a member of the enterprise, relaying the e-mail to the recipient without inserting either the icon link or the graphical icon, and without inserting an award link, into the e-mail.

2. The method as recited in claim 1, further comprising:
   receiving at a web server a request for the graphical icon associated with the icon link; and
   providing the graphical icon to the recipient.

3. The method as recited in claim 1, further comprising:
   receiving at a web server a request, from the recipient, for a web page associated with the award link;
   generating an award web page based on the award link; and
   providing the award web page to the recipient.

4. A method for recognizing individual achievements in an enterprise via e-mail, the method comprising:
   receiving at an e-mail server for the enterprise an e-mail from a sender who is a member of the enterprise and has previously been recognized by the enterprise with at least one award;
   generating an award link to a dynamically generated web page listing award information for the sender;
   generating a graphical icon or an icon link for a graphical icon representing at least one award received by the sender;
   inserting the award link, and the graphical icon or icon link, into the e-mail and relaying the e-mail to a recipient;
   receiving at a web server a request for the graphical icon associated with the icon link, if the icon link is inserted into the email; and
   responsive to a determination that the recipient is not a member of the enterprise, refraining from providing the graphical icon to the recipient.

5. A method for recognizing individual achievements in an enterprise via e-mail, the method comprising:
   receiving at an e-mail server for the enterprise an e-mail from a sender who is a member of the enterprise and has previously been recognized by the enterprise with at least one award;
   generating an award link to a dynamically generated web page listing award information for the sender;
   generating a graphical icon or an icon link for a graphical icon representing at least one award received by the sender;
   inserting the award link, and the graphical icon or icon link, into the e-mail;
   relaying the e-mail to a recipient;
   receiving a request for a web page associated with the award link; and
   responsive to a determination that the request is not from a member of the enterprise, refraining from providing the award web page to the recipient.

6. A method for recognizing individual achievements in an enterprise via e-mail, the method comprising:
  receiving at an e-mail server for the enterprise an e-mail from a sender who is a member of the enterprise and has previously been recognized by the enterprise with at least one award;
  generating an award link to a dynamically generated web page listing award information for the sender;
  generating a graphical icon or an icon link for a graphical icon representing at least one award received by the sender;
  inserting the award link, and the graphical icon or icon link, into the e-mail; and
  relaying the e-mail to a recipient;
  wherein the award link includes a private address that cannot be read outside a predefined private network.

7. A method for recognizing individual achievements in an enterprise via e-mail, the method comprising:
  receiving at an e-mail server for the enterprise an e-mail from a sender who is a member of the enterprise and has previously been recognized by the enterprise with at least one award;
  generating an award link to a dynamically generated web page listing award information for the sender;
  generating an icon link for a graphical icon representing at least one award received by the sender;
  inserting the award link and the icon link into the e-mail; and
  relaying the e-mail to a recipient;
  wherein the icon link is to a resource not available outside a predefined network.

8. A computer program product stored in a non-transitory, tangible computer readable media for use in a data processing system for recognizing individual achievements via e-mail, the computer program product comprising:
  instructions for receiving at an e-mail from a sender for an enterprise e-mail from a sender who is a member of the enterprise and has previously been recognized by the enterprise with at least one award;
  instructions for generating an award link to a dynamically generated web page listing award information for the sender;
  instructions for generating a graphical icon or an icon link for a graphical icon representing at least one award received by the sender;
  instructions for inserting the award link and the graphical icon or the icon link into the e-mail if a recipient of the email is a member of the enterprise;
  instructions for, responsive to a determination that a recipient is not a member of the enterprise, forwarding the e-mail to the recipient without inserting either the graphical icon or the icon link, and without inserting an award link, into the e-mail; and
  instructions for relaying the e-mail to a recipient.

9. The computer program product as recited in claim 8, further comprising:
  instructions for receiving at a web server a request for the graphical icon associated with the icon link and providing the graphical icon to the recipient.

10. The computer program product as recited in claim 8, further comprising:
  instructions for receiving at a web server a request, from the recipient, for a web page associated with the award link;
  instructions for generating an award web page based on the award link; and
  instructions for providing the award web page to the recipient.

11. The computer program product as recited in claim 8, further comprising:
  instructions for receiving, at a web server, a request for the graphical icon associated with the icon link, if inserted; and
  instructions for, responsive to a determination that the request is not from a member of the enterprise, refraining from providing the graphical icon in response to the request.

12. The computer program product as recited in claim 8, further comprising:
  instructions for receiving at a web server a request for a web page associated with the award link; and
  instructions for, responsive to a determination that the request is not from a member of the enterprise, refraining from providing the award web page in response to the request.

13. The computer program product as recited in claim 8, wherein the award link includes a private address that cannot be read outside a predefined private network.

14. The computer program product as recited in claim 8, wherein the icon link is to a resource not available outside a predefined network.

15. A system for recognizing individual achievements in an enterprise via e-mail, the system comprising:
  an e-mail server for an enterprise for receiving e-mail being sent by members of the enterprise;
  means for generating upon the e-mail server receiving an e-mail message being sent by one of the members of the enterprise an award link to a dynamically generated web page listing recognition award information previously given to the member sending the e-mail;
  means for appending the award link into the e-mail prior to the e-mail server relaying the e-mail to a recipient if the recipient is a member of the enterprise; and
  means for, responsive to a determination that the recipient is not member of the enterprise, relaying the e-mail to the recipient without inserting an award link into the e-mail.

16. The system as recited in claim 15, further comprising:
  a web server programmed for receiving a request, from the recipient, for a web page associated with the award link and serving an award web page based on the award link.

17. The system as recited in claim 15, further comprising:
  a web server for receiving a request, from the recipient, for a web page associated with the award link; and
  means for, responsive to a determination that the recipient is not an employee of the enterprise, refraining from providing the award web page to the recipient.

18. The system as recited in claim 15, wherein the award link includes a private address that cannot be read outside a predefined private network.

19. The system as recited in claim 15, wherein the means for appending the award link into the e-mail further comprises:
  means for embedding in the e-mail an icon or an icon link to a graphical icon representing at least one member recognition award given to the member sending the e-mail.

20. The system as recited in claim 19, further comprising:
a web server for receiving a request for the graphical icon associated with the icon link and providing the graphical icon in response thereto.

21. The system as recited in claim 19, further comprising:
means for receiving a request for the graphical icon associated with the icon link; and
means for, responsive to a determination that the request is not from an employee of the enterprise, refraining from providing the graphical icon to the recipient.

22. The system as recited in claim 19, wherein the icon link is to a resource not available outside a predefined network.

* * * * *

UNITED STATES PATENT AND TRADEMARK OFFICE
CERTIFICATE OF CORRECTION

| | | |
|---|---|---|
| PATENT NO. | : 8,171,086 B2 | Page 1 of 1 |
| APPLICATION NO. | : 11/562769 | |
| DATED | : May 1, 2012 | |
| INVENTOR(S) | : Ned Bryant | |

It is certified that error appears in the above-identified patent and that said Letters Patent is hereby corrected as shown below:

In the Specification:

At column 4, line number 62, please replace [c-mail] with -- e-mail --.

In the Claims:

At column 6, claim number 5, line number 60, please replace the phrase [graphical icon or icon link,] with the phrase -- graphical icon or the icon link, --.

At column 6, claim number 5, line number 67, please delete "award".

At column 7, claim number 6, line number 9, please delete "an".

At column 7, claim number 6, line number 12, please replace the phrase [graphical icon or icon link,] with -- graphical icon or the icon link, --.

At column 7, claim number 8, line number 37, please replace [from a sender] with -- server --.

At column 8, claim number 14, line number 26, after "icon link" please add -- , if inserted, --.

At column 8, claim number 17, line numbers 54-56, please replace the lines in their entirety with the following:
        -- means for, responsive to a determination that the request is not from a member of the enterprise, refraining from providing the award web page in response to the request. --.

Signed and Sealed this
Third Day of July, 2012

David J. Kappos
*Director of the United States Patent and Trademark Office*